United States Patent [19]

Montanari et al.

[11] Patent Number: 4,790,571
[45] Date of Patent: Dec. 13, 1988

[54] QUICK-COUPLING CONNECTOR GROUP FOR PIPES, PILES OR THE LIKE

[75] Inventors: Paolo Montanari, San Lazzaro; Oneglio Sala, Bologna, both of Italy

[73] Assignee: Riva Calzoni S.p.A., Bologna, Italy

[21] Appl. No.: 38,034

[22] Filed: Apr. 14, 1987

[30] Foreign Application Priority Data

Apr. 15, 1986 [IT] Italy ............................. 20091 A/86

[51] Int. Cl.⁴ ............................................. F16L 15/00
[52] U.S. Cl. ........................................ 285/86; 285/90; 285/315; 285/322; 405/251
[58] Field of Search ................. 285/86, 90, 315, 319, 285/322, 323; 405/251; 403/314, 309

[56] References Cited

U.S. PATENT DOCUMENTS

| | | | |
|---|---|---|---|
| 1,234,537 | 7/1917 | Goodall | 285/322 |
| 1,799,941 | 4/1931 | Wulle | 285/323 |
| 2,784,987 | 3/1957 | Corcoran | 285/322 X |
| 3,071,188 | 1/1963 | Rawlins | 285/322 X |
| 3,394,950 | 7/1968 | Jensen | 285/322 X |
| 3,394,954 | 7/1968 | Sarns | 285/314 |
| 3,455,579 | 7/1969 | Olliff et al. | 285/314 X |
| 3,600,007 | 8/1971 | Morris | 285/322 X |

Primary Examiner—Dave W. Arola
Attorney, Agent, or Firm—Herbert Dubno

[57] ABSTRACT

The quick-coupling connector assembly for pipes, piles or the like is constituted of a pair of half-couplers, male and female respectively, capable of being connected to the ends of the pipe to be joined. The male half-coupler possess, on its external surface, an annular raised profile capable of being coupled with a corresponding annular raised profile present on the internal surface of the female half-coupler close to its end, the female half-coupler being equipped, starting from its end, wih axial slits defining, along its entire surface, a plurality of outwardly elastically flexible lamellar elements, adapted to permit the fitting of the female half-coupler over the male half-coupler and the coupling together of the respective raised annular profiles. An axially movable ring is also provided, capable of being fitted over the female half-coupler and of being blocked in position for preventing radial deformations at the end of zone of the female half-coupler itself.

12 Claims, 6 Drawing Sheets

4,790,571

QUICK-COUPLING CONNECTOR GROUP FOR PIPES, PILES OR THE LIKE

FIELD OF THE INVENTION

The subject of the present invention is a quick-coupling connector assembly for permitting rapid and rigid interconnection of pipes, piles or the like for full strength in the joint zone.

BACKGROUND OF THE INVENTION

Construction elements, such as pipes, tubular piles and the like, are used in many works, such as for example for the fixing of marine platforms to the sea bed, for the construction of well casings, for foundations and the like.

In such structures, it is necessary to have available tubular components of considerable length, greater than the maximum commercially available or transportable length; for this purpose, therefore, a number of tubular sections must be connected together on the jobsite in order to achieve the desired dimension of the tubular element required.

The mechanical joining of lengths of tubes may be carried out by means of various types, which must provide a rigid joint capable of reproducing the mechanical strength characteristic of the tubular element in order to guarantee structural continuity.

At present, various types of joint are known. They can provide for the construction of the joint by mutual screwing together of adjacent lengths, or by coupling them together by elastic deformation. Such operations require the use of complex equipment, which shall provide for the suspension and rotation of one of the pipe lengths relative to the other, in order to obtain the joint by a screw joint or which shall produce the necessary loading for obtaining the coupling required by elastic deformations. In both these cases, the operations carried out demand considerable time and govern the speed of execution of the entire assembly and installation operation.

OBJECT OF THE INVENTION

It is an object of the invention to provide a connection assembly for tubular elements which permits rapid joining together of lengths of pipe, with the use of simple equipment, producing a joint which shall possess the best possible mechanical characteristics and cannot be accidentally loosened, but nevertheless can be disconnected if the occasion arises.

SUMMARY OF THE INVENTION

These results are obtained by the present invention, which provides a quick-coupling connector assembly for pipes, piles or the like, which is constituted of a pair of half-couplers, respectively male and female, capable of being rigidly connected to the corresponding ends of the pipes to be joined together. The male half-coupler possesses, on its external surface, an annular raised profile capable of being coupled to a corresponding annular raised profile present on the internal surface of the female half-coupler close to its end. The female half-coupler is equipped, starting from its end, with axial slits defining, along its entire surface, a plurality of lamellar elements which are elastically flexible outwardly, such as to permit by their deformation the fitting of the female half-coupler over the male half-coupler and the coupling together of the respective raised annular profiles. An axially movable ring has an internal diameter equal to the external diameter of the female half-coupler in its zone internally equipped with the raised annular profile and with the axial slits in the undeformed condition, the ring being capable of being fitted over the female half-coupler and blocked, thereby preventing radial deformations at the end zone itself of the female half-coupler.

In greater detail, the annular raised profiles of the male and female half-couplers are each composed of at least one raised zone, respectively external and internal, with a sawtooth section having, for both the half-couplers, a conical surface with a small cone angle facing towards the free end of the half-coupler and an opposite conical surface, with a large cone angle, facing towards the pipe or pile to which the half-coupler is connected.

With advantage, the raised annular profiles are constituted of opposed annular sets of teeth of sawtooth form, with the raised parts of the one capable of insertion into the spaces contained between two adjacent raised parts of the other, situated on corresponding conical surfaces.

The axially slidable ring, in one embodiment of this invention, is situated around the external surface of the female half-coupler and can be held in a retracted position, which does not obstruct the radial deflections of the lamellar elements, and brought into an advanced position by axial sliding on the female half-coupler, thereby surrounding the end of the lamellar elements and preventing their deformation in the radial direction.

In this embodiment, the axially slidable ring possesses an internal conical surface, diverging towards the end of the female half-coupler, while a corresponding conical surface, diverging towards the free end of the half-coupler is present on the external surface of the lamellar elements of the female half-coupler, the forced sliding of the ring into the advanced position determining a radial inward deflection of the lamellar element, thereby forcing the female half-coupler onto the male half-coupler between the mating conical surfaces of wide cone angle of the annular raised zones and the abutment surfaces of the male half-coupler inside the female half-coupler.

According to an alternative embodiment, the axially slidable ring possesses a portion having internal thread, screwed onto a threaded portion situated on the external surface of the male half-coupler behind the raised annular profile, and may be held in a retracted position on the male half-coupler, where it does not obstruct the radial deflection of the lamellar elements of the female half-coupler, and brought into an advanced position by screwing on the threaded portion of the male half-coupler, thereby surrounding the end of the lamellar elements and preventing their deformation in the radial direction.

In this embodiment, the axially slidable ring possesses an internal conical surface, diverging towards the end of the male half-coupler, while a corresponding conical surface, converging towards the free end of the half-coupler, is present on the external surface of the lamellar elements of the female half-coupler, starting from their end, the screwing of the ring on the male half-coupler into the advanced position causing a radial inward deflection of the lamellar elements, with forcing of the female half-coupler into the male half-coupler between the coupled conical surfaces of wide cone angle of the annular raised zones and the abutment surfaces of the male half-coupler inside the female half-coupler.

In both these embodiments, there are provided, in the axially movable ring, screw means for blocking the ring itself in the position surrounding the lamellar elements of the female half-coupler.

According to a further embodiment there is provided, on the male half-coupler, a second axially slidable ring having a conical portion capable of being coupled with a corresponding conical internal surface of the end of the female half-coupler and capable of being introduced with an axial advancing movement inside same, thereby determining the radial outward deflection of the lamellar elements of the female half-coupler, causing disengagement of the respective raised profiles of the half-couplers, means being provided for blocking said second ring in the retracted position.

In this embodiment, the means for blocking the second ring in the retracted position are constituted of the anterior surface of the axially slidable ring, adapted for bearing against the second ring, blocking its advance, when the axially movable ring, surrounding the female half-coupler, is advanced onto same and is blocked in position around the mutual engagement zone of the respective raised profiles.

According to a further embodiment, the raised profiles are constituted of opposed sets of teeth of sawtooth form, having corresponding conical surfaces facing towards the ends of the half-couplers and opposite, undercut re-entrant surfaces, these surfaces being capable of being coupled together, the coupling of said undercut surfaces determiming, when tension is applied to the half-couplers, an increase in the mutual penetration of the sets of teeth. The male half-coupler is equipped with an externally threaded portion, behind the sets of teeth, on which is seated a threaded ring capable of being axially advanced by screwing into abutment against the end of the lamellar elements of the female half-coupler, thereby causing gripping between the undercut, re-entrant surfaces of the sets of teeth of the male and female half-couplers, by elimination of the existing axial clearances.

BRIEF DESCRIPTION OF THE DRAWING

Further details will become apparent from the following description, with reference to the accompanying drawing, in which: there are shown.

SPECIFIC DESCRIPTION

Figure 1:
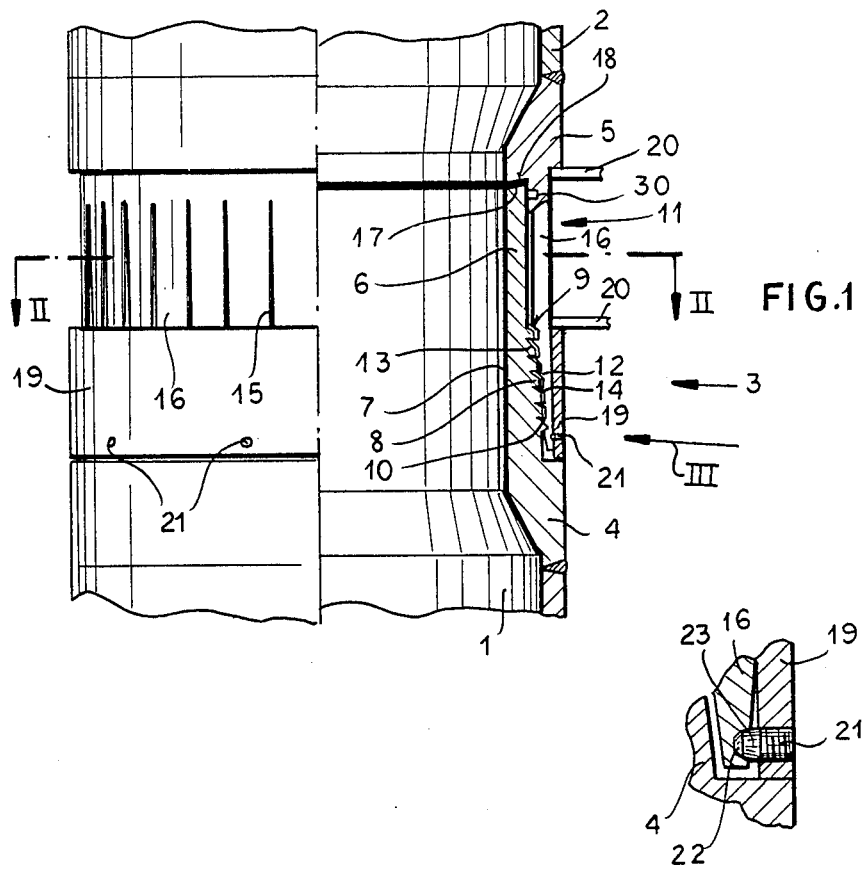
FIG. 1 is a fragmentary elevation, partly broken away, of the connector according to this invention in one form of embodiment, in the coupled position.
Figure 2:
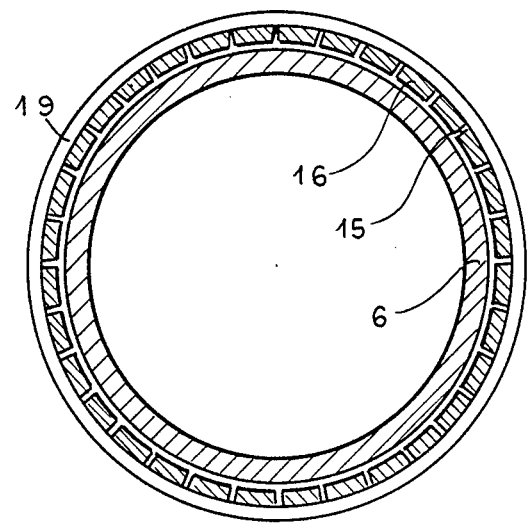
FIG. 2 is a section taken along the line II—II of FIG. 1.

As FIGS. 1 and 2 show, a pair of tubular elements 1, 2 can be connected together by a quick-coupling connector assembly 3, constituted of a male half-coupler 4 and female half-coupler 5, attached respectively to tubular element 1 and tubular element 2, for example, as illustrated by welding.

The male half-coupler 4 has a cylindrical body provided close to its end with a first fitting and guiding portion 6 with a smooth external surface and, thereafter, a coupling portion 7 having two or more annular raised zones forming an annular set of teeth 8 of sawtooth section, with conical surfaces 9 having a small cone angle (apex angle) of each annular raised zone and facing upwards, and opposite conical surfaces 10 of the annular raised zones, having a large cone angle (apex angle) and facing downwards.

The female half-coupler 5, for its part, is constituted of a cylindrical body having an anterior or end portion 11 having an internal diameter greater than the external diameter of the male half-coupler 4, this anterior or end portion possessing, opposite to the annular set of teeth 8, internal annular raised zones forming an internal annular set of teeth 12 of sawtooth section having conical surfaces 13 with a small cone angle facing downwards and opposite conical surfaces 14, with a large cone angle, facing upwards, and of a diameter such as to couple with the set of teeth 8. The end portion 11 of the half-coupler 5 possesses furthermore a plurality of longitudinal slits 15, which define a plurality of lamellar elements 16.

Figure 13:
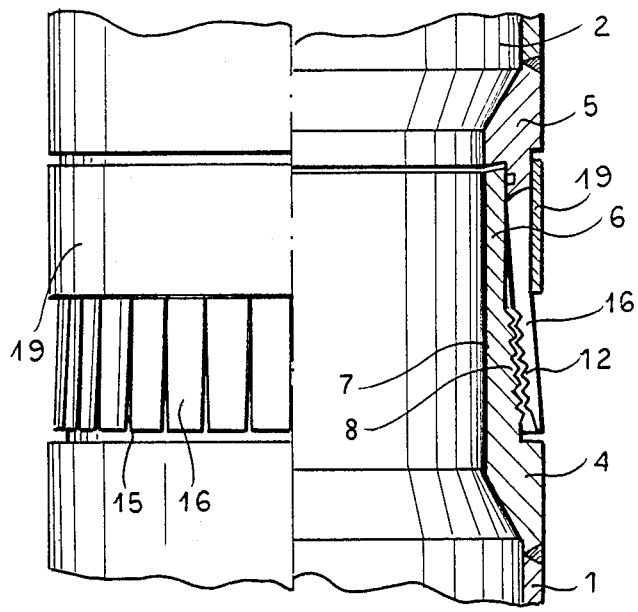
FIG. 13 is a view similar to FIG. 1 showing the connector of FIG. 1 during the assembly stage.

The lamellar elements 16 possess elastic deformability in the radial direction, which enables them to move apart, as shown in FIG. 13 during the coupling stage of the connector, by sliding of the corresponding conical surfaces 9, 13 over one another; this permits the insertion of the male half-coupler 4 into the female half-coupler 5, with coupling together of the corresponding surfaces of the sets of teeth 8 and 12 when the lamellar elements 16 return into the undeformed position, until contact occurs between the end surface 17 of the male half-coupler 4 and the internal raised stop surface 18 of the female half-coupler 5.

For the purpose of facilitating mutual fitting and sliding of the two parts of the connector, the sets of teeth 8 and 12 have primary conical surfaces. Outside the female half-coupler 5 there is an axially slidable ring 19, having an internal diameter equal to the external diameter of the portion 11 in the undeformed state.

The ring 19, at the stage of connecting the half-couplers of the connector, is held as shown in FIG. 13 in a raised position or retracted; when coupling of the annular sets of teeth 8, 12 has taken place, the ring 19 is lowered or advanced into the position shown in FIG. 1, surrounding the sets of teeth themselves now in mutual engagement, in such a way as to prevent any further deformation of the lamellar elements 16, thereby guaranteeing complete solidarity of the joint.

For advancing the ring 19, a device 20 is provided, shown schematically in FIG. 1, actuated by, for example, hydraulic servo-actuators.

Figure 3:
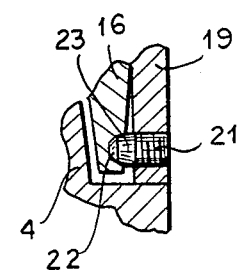
FIG. 3 is a detail of the region III of FIG. 1.

The ring 19 is kept in the lowered position or, more generally, if the orientation of the pipes or piles to be joined is not vertical, in an advanced position towards the free end of the half-coupler 5, by means of one or more wedge screws 21, shown more clearly in FIG. 3, inserted into a threaded hole of the ring 19 and tightened inside the conical hole 22 of one or more lamellar elements 16 by their points 23.

The assembling of the connector group may be carried out simply, especially in the usual case where the tubular elements are positioned vertically: In fact the upper tubular element, carrying the female half-coupler, with the ring 19 in the retracted position, and kept in this position, for example, by dowels or the like, may be lowered onto the lower tubular element carrying the male half-coupler, sliding on it as a result of the outward elastic deformation of the lamellar elements and the relevant sliding of the conical surfaces of the annular raised zones, until the corresponding surfaces 17, 18 come into abutment and the sets of teeth 8, 12 simultaneously couple together, which produces a final rigid locking of the joint.

The ring 19 can now be lowered by the device 20, to surround the mutual-coupling zone of the sets of teeth 8, 12 and finally prevent any relative movement between the coupled-together half-couplers and the tubular elements connected to them.

Figure 4:
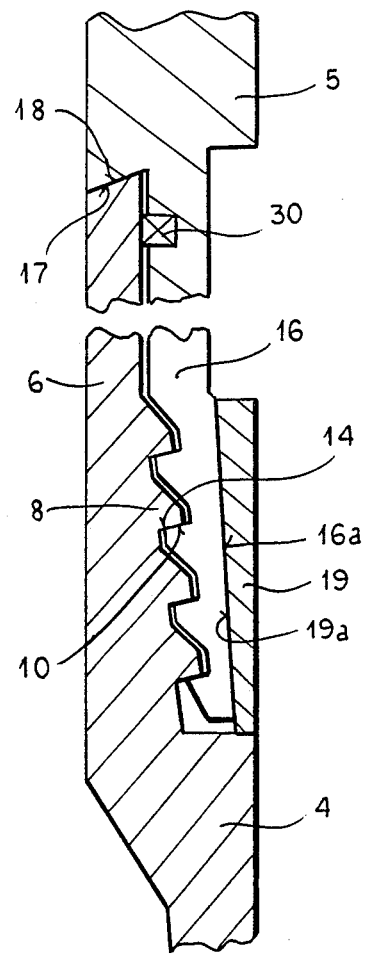
FIG. 4 is an enlarged detail of the connector of FIG. 1.

As FIG. 4 shows, when the surfaces 17, 18 come into abutment, the convex conical surfaces 10 of the male half-coupler are in contact with the corresponding surfaces 14 of the female half-coupler; the external surface 16a of the lamellar elements 16 of the female half-coupler, in the ene zone of the elements themselves, is moreover provided with a slight conicity or taper, having its larger diameter towards the end, and a corresponding conicity is possessed by the relevant coupling surface 19a of the ring 19.

An appropriate dimensioning of the connector will ensure that the maximum advanced position of the ring 19 causes, by action of the coupled surfaces 16a, 19a, a clamping of the lamellar elements 16 onto the portion 7 of the male half-coupler, with relative sliding of the conical surfaces 10, 14, thereby producing in the lamellar elements 16 of the female half-coupler and in the portions 6, 7 of the male half-coupler, as a result of the inclination of the surfaces 10, 14 themselves and of the bearing of the surfaces 17, 18, an axial loading which produces a tightening of the connector, creating the rigidity characteristics required.

Figure 5:
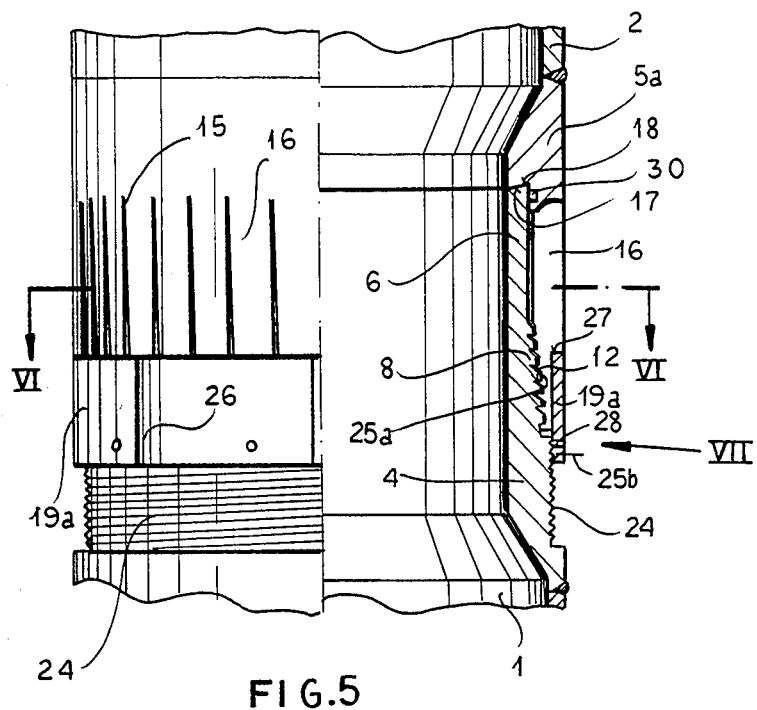
FIG. 5 is a view similar to FIG. 1 showing in a different embodiment, in the coupled position.
Figure 6:
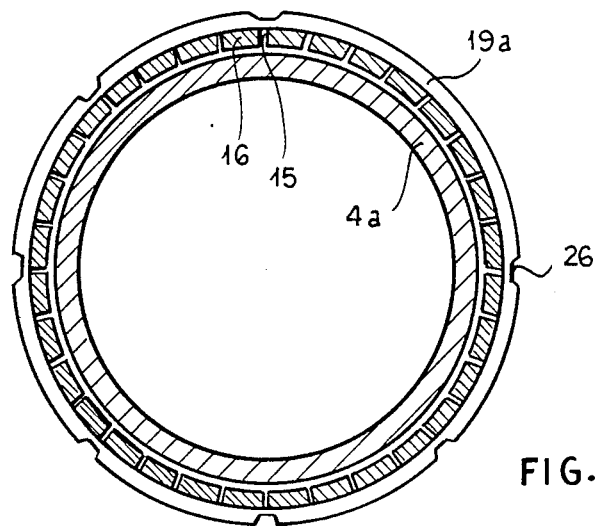
FIG. 6 is a section taken along line VI—VI of FIG. 5.

In FIGS. 5, 6 there is shown an alternative embodiment, in which the male half-coupler 4a possesses, adjacent to the annular set of teeth of sawtooth form 8, a threaded portion 24, on whole a ring 19a is screwed, equipped with an internally smooth portion 25a capable of being coupled with the end portion 16a of the lamellar elements 16, and with an internally threaded portion 25b, by which the ring is screwed on the threaded portion 24 of the male half-coupler.

Figure 14:
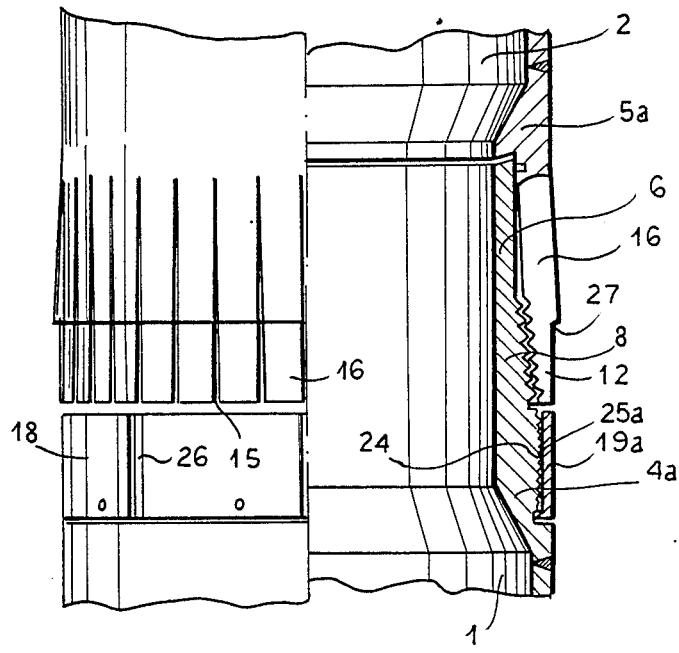
FIG. 14 is a view similar to FIG. 4 showing the connector of FIG. 4 during the assembly stage.

During assembling of the half-couplers, the ring 19a is kept in the retracted position on the male half-coupler 4a, as illustrated in FIG. 14; when, in a manner analogous to that described with reference to FIGS. 1, 2, the female half-coupler 5a is fitted onto the male half-coupler 4a with mutual coupling together of the sets of teeth 8, 12, the ring 19a is advanced, by screwing it by acting on the gripping recesses 26 situated on the external surface with a screwing device, not shown, until it comes into a position surrounding the end of the lamellar elements 16 in the position illustrated in FIG. 4, tightening it and the lamellar elements until it reaches the abutment surface 27.

Figure 7:
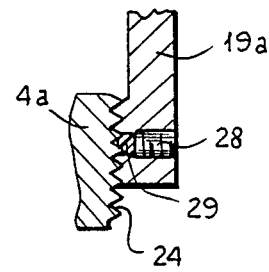
FIG. 7 is a detail view of the region VII of FIG. 5.

The ring 19a is therefore held in the position surrounding the lamellar elements 16 in such a way as to prevent them from deforming and loosening the connection between the half-couplers, the ring being secured by dowels 28, one of which is shown in FIG. 7 to enlarged scale, possessing at the end a portion of deformable material 29, such as elastomeric material, lead or the like, adapted for acting upon the threaded zone 24 and blocking the unscrewing of the ring 19a.

Figure 8:
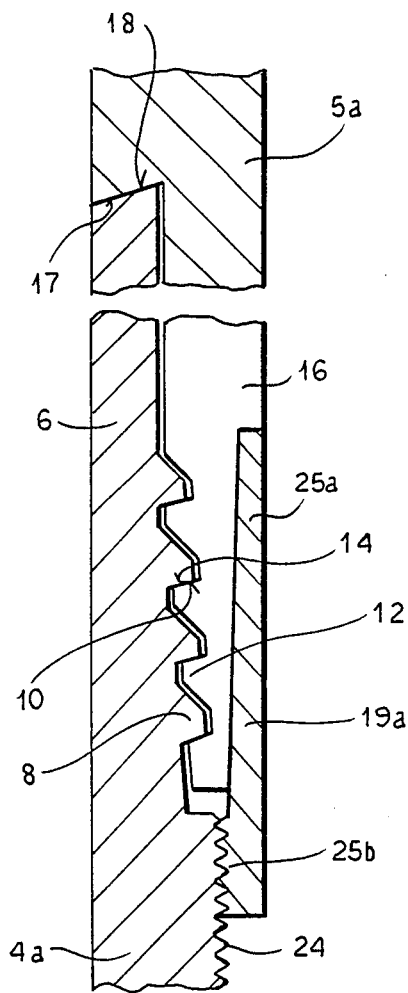
FIG. 8 is an enlarged detail of the connector of FIG. 5.

As FIG. 8 shows, the smooth internal surface of the portion 25a of the ring 19a has a conicity diverging towards the unthreaded end of the ring, while a corresponding conicity is formed on the surface of the end portion of the lamellar elements 16.

In this way, screwing-up of the ring 19a as far as the abutment position against the surface 27 leads to relative tightening of the corresponding conical surfaces 10, 14 of the sets of teeth 8, 12, in a manner analogous to that described with reference to FIG. 4, i.e., by a wedging action, thereby achieving a tight assembly of the joint which eliminates any play and ensures the necessary rigidity.

The hydraulic tightness, if required, of the joint between the half-couplers 4 or 4a and 5 or 5a, is provided by a seal 30 seated in the female half-coupler, near to the abutment surface 18, and acting upon the cylindrical surface of the portion 6 of the male half-coupler.

Figure 11:
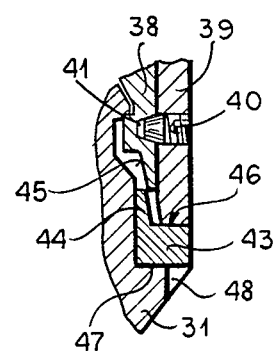
FIG. 11 is a detail view of the region XI of FIG. 9.
Figure 10:
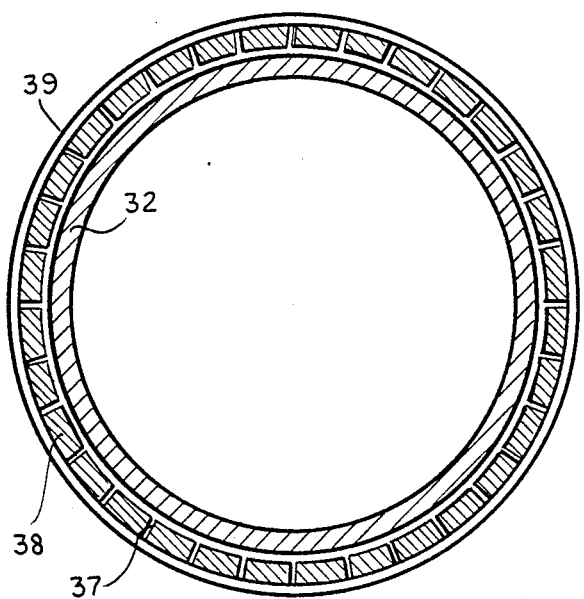
FIG. 10 is a section taken along the line X—X of FIG. 9.

FIGS. 9 to 12 show a connector with a reversible coupling. It is composed of a male half-coupler 31, equipped with a cylindrical end portion 32 and with an annular set of teeth of sawtooth form 33, analogous to that described earlier. Onto it, a female half-coupler 34 may be fitted, equipped with an anterior portion 35 having the internal annular set of teeth of sawtooth form 36, capable of engagement with the set of teeth 33, and furnished with the slits 37 defining the outwardly flexible lamellar elements 38. Around the portion 35 there is also situated the axially slidable ring 39, capable of being displaced around the coupling zone of the sets of teeth 33, 36 by a device 20, as already described, and of being blocked in position by screw wedges 40, inserted into the holes 41 of the lamellar elements 38, as illustrated in FIG. 11.

The tightness of the joint is assured by the seal 42, inserted into the female half-coupler 34 and acting upon the cylindrical portion 32 of the male half-coupler 31.

The male half-coupler 31 possesses, at the base of the zone having the annular set of teeth 33, an axially slidable ring 43, equipped with a conical portion 44 conjugate with the internal conical surface 45 of the lamellar elements 38 of the female half-coupler 34. The assembling of the half-couplers and their blocking by means of the ring 39 is carried out in a manner analogous to that described earlier. The ring 39, when it is situated in the advanced position as shown in detail in FIG. 11, acts with its end surface against the external flange 46 of the ring 43, blocking its retracted position in bearing against the abutment surface 47 of the male half-coupler 31.

Figure 9:
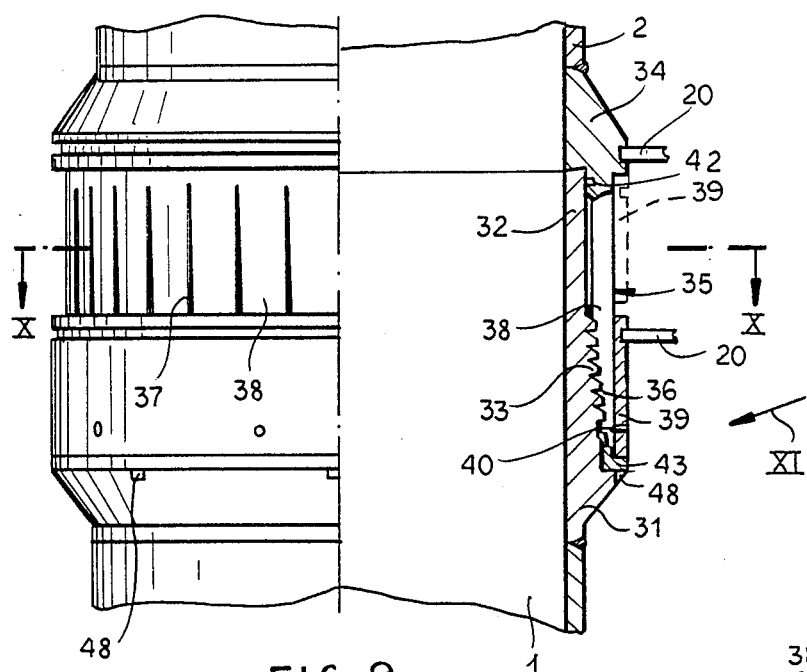
FIG. 9 is a view similar to FIG. 1 of embodiment, in the coupled position.
Figure 12:
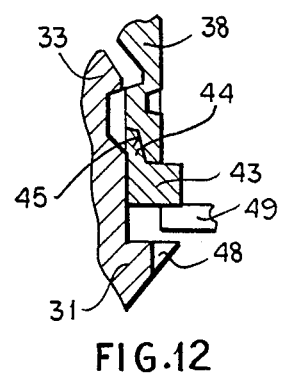
FIG. 12 is another detail view.

The half-couplers can be separated by removing the screw wedges 40 and retracting the ring 39 into the position shown in broken line in FIG. 9, in which position it can be held by dowels or the like; the ring 43 can then be advanced, by acting upon it through the notches 48 present in the body of the male half-coupler 31 by means of a tool 49, thus bringing its conical portion 44 to enter inside the lamellar elements 38 of the female half-coupler 34 and causing, as shown in FIG. 12, a radial outward bending of the lamellar elements themselves, which leads to mutual disengagement of the sets of teeth 33 and 36, which then enables the half-couplers to be separated.

Figure 15:
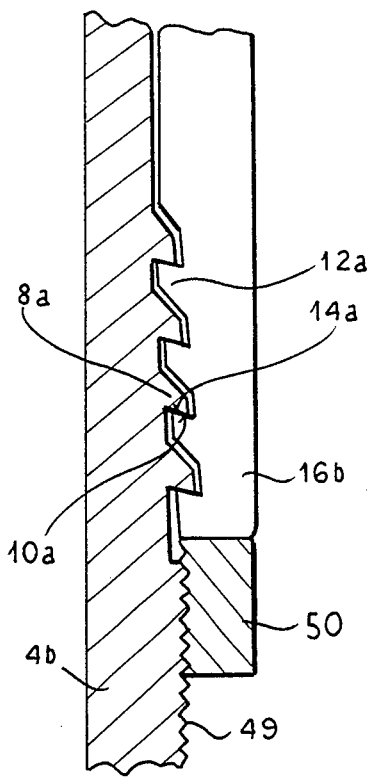
FIG. 15 is a detail view of the set of teeth of the connector in an alternative embodiment.
Figure 16:
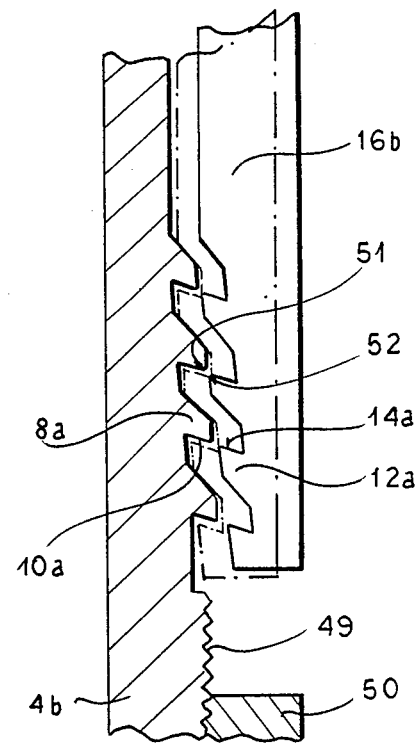
FIG. 16 is a detail of the connector of FIG. 15 during the assembly stage.

According to a further variant of construction, illustrated in FIGS. 15, 16, particularly suitable for the case where the main loading envisaged for the piles or pipes 1, 2 connected together will be in tension, the corresponding sets of teeth 8, 12 of the male half-coupler and female half-coupler are constructed with corresponding surfaces 10a, 14a of undercut forms, with a conicity having an inclination opposite to that described above; in this way the presence of an axial tensile loading in the connector causes a radially inward loading of the lamellar elements 16b, with greater interpenetration between the sets of teeth.

To prevent, on the other hand, an outward loading of the lamellar elements 16b from occurring if compressive forces should act in the joint, a threaded zone 49 is formed on the male half-coupler 4b, a ring 50 being seated on this threaded zone. This ring may then be screwed tightly onto the lamellar elements 16b, tightening the surfaces 10a, 14b against one another and resisting the compressive loads applied.

As shown in FIG. 16, during assembling, the lamellar elements 16b bend outwards until the extreme edges 51 of the annular set of teeth 8a of the male half-coupler are cleared by the edges 52 of the set of teeth 12a of the lamellar elements of the female half-coupler; beyond this position, the lamellar elements can return elastically into the at-rest position, moving inwards as illustrated in the Figure with dot-and-dash lines.

This position comprises a clearance between the surfaces 10a, 14a as shown in FIG. 16, which clearance is then recovered, as shown in FIG. 15, by screwing up of the ring 50, which raises the female half-coupler until the surfaces 10a, 14a are brought into contact, tightening them until the desired tight fit is obtained.

Many variants can be introduced without thereby departing from the scope of the invention in its general characteristics.

We claim:

1. A quick-coupling assembly for joining together two tubular members, said assembly comprising:
    a male half-coupler connected to one of said tubular members and comprising:
        a tubular body having a free end forming an axial-abutment surface,
        a tubular portion formed on said body and extending away from said axial abutment surface toward said one of said tubular members, and
        an external raised annular profile formed on said body adjacent said tubular portion;
    a female half-coupler connected to the other of said tubular members and receiving said tubular portion and said external annular raised profile, said female half-coupler being formed with:
        a multiplicity of axially extending slits running to a free end of said female half-coupler and defining outwardly deflectable flexible lamellar elements, internally of said female half-coupler on said lamellar elements and close to said free end of said female half-coupler, formations matingly interlockable with said external raised profile whereby said flexible lamellar elements are outwardly deflected upon axial fitting of said male half-coupler into said female half-coupler until said formations interlock with said external raised profile, and
        spaced axially inwardly of said formations, an annular inwardly extending axial-abutment surface abuttingly engageable with said axial-abutment surface on said free end of said body; and
    an axially movable ring mounted on one of said half-couplers and having an internal diameter equal to an external diameter of said female half-couplers in a zone thereof provided with said formations in an undeflected state of said lamellar elements, said ring being shiftable over said zone to prevent radial deformation of said female half-coupler at said free end thereof and secure said joint.

2. The quick-coupling connector assembly defined in claim 1, wherein the raised annular profiles of the male and female half-couplers are constituted each of at least one raised zone, respectively external and internal, with a sawtooth section having, for both the half-couplers, a conical surface with a small cone angle facing towards the free end of the half-coupler and an opposite conical surface, having a wide cone angle, facing towards the member to which the half-coupler is connected.

3. The quick-coupling connector assembly defined in claim 2 wherein the raised annular profiles and formations are constituted of opposed annular sets of teeth of sawtooth form, having the raised zones of the one capable of being engaged into the spaces contained between two adjacent raised zones of the other, situated on corresponding conical surfaces.

4. The quick-coupling connector assembly defined in claim 2 wherein the raised profiles are constituted of opposite sets of teeth of sawtooth form, having corresponding conical surfaces facing towards the ends of the half-couplers and undercut, re-entrant opposite surfaces capable of being coupled together, the coupling of said undercut surfaces causing, in the case where a tensile force is applied to the half-couplers, an increase in the interpenetration of the sets of teeth.

5. The quick-coupling connector assembly defined in claim 4 wherein the male half-coupler is equipped with an externally threaded portion, behind the set of teeth, on which there is situated a threaded ring capable of being axially advanced by screwing into bearing against the end of the lamellar elements of the female half-coupler, thereby causing a relative clamping together of the undercut, re-entrant surfaces of the sets of teeth of the male and female half-couplers, eliminating the axial clearance existing.

6. The quick-coupling connector assembly defined in claim 1 wherein the axially slidable ring is situated around the external surface of the female half-coupler and can be retained in a retracted position in which it does not obstruct the radial deflection of the lamellar elements, and can be brought into an advanced position by axial sliding on the female half-coupler, surrounding in this position the ends of the lamellar elements and blocking their deformation in a radial direction.

7. The quick-coupling connector assembly defined in claim 6 wherein the axially slidable ring possesses an internal conical surface diverging towards the end of the female half-coupler, while a corresponding conical surface, diverging towards the free end of the half-coupler, is present on the external surface of the lamellar elements of the female half-coupler, the forced axial displacement of the ring into the advanced position causing a radial inward deflection of the lamellar elements, accompanied by forcing of the female half-coupler onto the male half-coupler between the coupled-together conical surfaces having a wide cone angle of the raised annular zones and the abutment surfaces inside the female half-coupler.

8. The quick-coupling connector assembly defined in claim 6 wherein there are provided, in the axially movable ring, screw means for blocking the ring itself in a position surrounding the lamellar elements of the female half-coupler.

9. The quick-coupling connector assembly defined in claim 1 wherein the axially slidable ring possesses a portion having an internal threaded zone, screwed into a threaded portion situated on the external surface of the male half-coupler behind the raised annular profile, and can be retained in the retracted position on the male half-coupler, where it does not obstruct the radial deflection of the lamellar elements of the female half-coupler, and can be brought into an advanced position by screwing up on the threaded portion of the male half-coupler, in which this ring surrounds the end of the lamellar elements and blocks their deformation in the radial direction.

10. The quick-coupling connector assembly defined in claim 9 wherein the axially slidable ring possesses a conical internal surface, diverging towards the end of the male half-coupler, while a corresponding conical surface, converging towards the free end of the half-coupler, is present on the external surface of the lamellar elements of the female half-coupler, starting from their end, the screwing of the ring on the male half-coupler into the advanced position determining a deflection of the lamellar elements in the radial inward direction, accompanied by forcing of the female half-coupler onto the male half-coupler between the coupled-together conical surfaces having a wide cone angle of the raised annular zone and the abutment surfaces inside the female half-coupler.

11. The quick-coupling connector assembly defined in claim 1 wherein there is present, on the male half-coupler, a second axially slidable ring having a conical portion capable of being coupled with a corresponding conical internal surface of the end of the female half-coupler and capable of being inserted by an axial advancing movement inside same, thereby determining the radial outward deflection of the lamellar elements of the female half-coupler and causing disengagement of the respective raised profiles of the half-couplers, means being provided for blocking said second ring in a retracted position thereof.

12. The quick-coupling connector assembly defined in claim 11 wherein the means for blocking the second ring in the retracted position thereof are constituted of an anterior surface of the first mentioned axially slidable ring, adapted for coming into bearing against the second ring, blocking its advance when the first axially movable ring, surrounding the female half-coupler, is advanced on same and is blocked in position around the mutual engagement zone of the raised profiles and the formations.

* * * * *